United States Patent
Welch

(10) Patent No.: US 10,890,976 B2
(45) Date of Patent: Jan. 12, 2021

(54) PRESSURE CONTROLLED KINETIC FEEDBACK PLATFORM WITH MODULAR ATTACHMENTS

(71) Applicant: Jeff Welch, Falls Church, VA (US)

(72) Inventor: Jeff Welch, Falls Church, VA (US)

( * ) Notice: Subject to any disclaimer, the term of this patent is extended or adjusted under 35 U.S.C. 154(b) by 67 days.

(21) Appl. No.: 16/350,061

(22) Filed: Sep. 21, 2018

(65) Prior Publication Data

US 2020/0097088 A1 Mar. 26, 2020

(51) Int. Cl.
| | |
|---|---|
| *G06F 3/01* | (2006.01) |
| *G03B 21/14* | (2006.01) |
| *G02B 27/01* | (2006.01) |
| *A63B 22/14* | (2006.01) |

(52) U.S. Cl.
CPC .............. *G06F 3/016* (2013.01); *A63B 22/14* (2013.01); *G02B 27/017* (2013.01); *G03B 21/145* (2013.01); *G06F 3/012* (2013.01); *G06F 2203/013* (2013.01)

(58) Field of Classification Search
CPC ....... G06F 3/012; G06F 3/016; G02B 27/017; G03B 21/145; A63B 22/14; A63B 22/16; A63B 22/18; A63B 69/0022; A63B 69/0066; A63B 69/0093; A63F 13/53; A63F 13/218; A63F 13/807; A63F 2300/8041; A63F 2300/8082
USPC ....................................................... 345/8, 156
See application file for complete search history.

(56) References Cited

U.S. PATENT DOCUMENTS

| | | | | |
|---|---|---|---|---|
| 5,049,079 A | * | 9/1991 | Furtado .................. | A63B 69/18 434/253 |
| 6,624,802 B1 | * | 9/2003 | Klein ...................... | A63F 13/06 345/156 |
| 8,529,418 B2 | * | 9/2013 | Stewart ................. | A63B 21/015 273/449 |
| 8,979,722 B2 | * | 3/2015 | Klein ..................... | A63F 13/807 482/129 |
| 2014/0256526 A1 | * | 9/2014 | Henson ................ | A63B 26/003 482/146 |

* cited by examiner

*Primary Examiner* — Jimmy H Nguyen

(57) ABSTRACT

The invention is a human-computer interface device which permits the user to control their movement within a Virtual Reality (VR) simulation and receive lifelike physical feedback. The platform will allow the user to stand on top of it and control their movement within a VR Environment by leaning in a direction. The platform's weight sensor system will detect which direction the user is leaning and output that information to the PC. The PC will calculate send the feedback controls to the platform, causing it to move and vibrate as applicable. The physical feedback will result in a more realistic experience while reducing the motion sickness associated with existing VR systems. This invention has a modular design that allows the user to utilize attachments for additional purposes such as a driving simulator. Although the invention was initially designed for VR, any interactive computer entertainment system could benefit.

11 Claims, 14 Drawing Sheets

PRESSURE CONTROLLED KINETIC FEEDBACK PLATFORM WITH MODULAR ATTACHMENTS

PRIORITY

This application claims priority from U.S. Provisional Patent Application Ser. No. 62/606,441 entitled Modular Kinetic Feedback Platform, filed on Sep. 25, 2017 and from U.S. Provisional Patent Application Ser. No. 62/763,285 entitled Pressure Controlled Kinetic Feedback Platform, which was filed on Jun. 11, 2018.

BACKGROUND OF THE INVENTION

Field of the Invention

The present invention relates generally to Virtual Reality (VR) and other interactive entertainment, more specifically, to a physical platform that will allow the user to control movement within a Virtual Environment (VE) based upon which direction they are leaning and placing pressure on the surface of the platform while standing upon it. VR is a field that involves the simulation of an experience within a Virtual Environment; comprising of a mixture of visual, audio, haptic, motion, and other sensory feedback such as smell and taste. The most common implementation of virtual reality consists of a Head Mounted Display (HMD) that is placed on the user's head and displays imagery for the user through a set of specialized screens and lenses. The simulation of senses is intended to reflect real environments and events, and is frequently based upon user interface with the computerized system that is generating the Virtual Environment in which the user is interacting with. For example, when the user turns their head, the screens display an image that reflects the Virtual Environment from a different angle corresponding to the user's current head position.

It is well documented that VR can cause nausea for users if the perceived images for the Virtual Environment do not correspond to the user's movement. For example, the images displayed by the HMD cause the perception of moving forward, while the user is physically remaining stationary. This nausea is frequently referred to as motion sickness. The cause of the motion sickness is frequently attributed to vestibular-ocular disconnect where the user's vestibular sense of position and balance is not consistent with their visual sense of the environment around them. This is a known problem in VR, as it limits the movement options within a Virtual Environment unless a user has specialized equipment for interacting with the VR system. For example, if a user is in a 10-foot-long VR room and the Virtual Environment they view through the HMD has a field that is a mile long, the user would only be able to walk 10 feet within that Virtual Environment.

The invention will provide multiple forms of kinetic feedback that simulate real life motion, which will provide a more realistic experience for the user while reducing or eliminating the motion sickness often associated with movement within virtual reality. This platform is not limited to Virtual Reality, but for other interactive experiences between a user and a computerized system. One example involves a user who is in front of a television screen or monitor and using the invention to interact with the virtual environment on the screen.

Additionally, employing VR in conjunction with this invention will add to the enjoyment and realism by adding real motion, action, and reaction to the perceived motion of a VR HMD.

Description of the Prior Art

Existing means of movement within VR consist of several options. Many of the existing movement options in VR involve a tradeoff between motion sickness or constraining the free and natural motion of the user. One option is free movement within a space limited by the size of the room and the range of the sensors that detect the position of the VR HMD. Another option is simulated movement that does not require the user to move from their place within the room, which may consist of a user moving their arms and/or legs in a way that corresponds to running in place, which causes the HMD to display the user moving forward while the user actually remains stationary within the room. Yet another option is specialized treadmills that allow the user to walk in a direction indefinitely without changing their position relative to the room. Another option is a chair or other interface that is mechanically controlled to simulate movement. For example, a chair that is controlled by a mechanical arm that can move in any direction corresponding to the motion in the Virtual Environment. VR HMD can be accompanied by a hand-held joystick or controller apparatus which the user can direct their movement by pointing in a direction similar to traditional video game controls, although this can lead to motion sickness. There are also options to use the joystick to automatically transport to a location by pointing to the location in the Virtual Environment and pressing a button, which will cause the user to be instantly conveyed to that location.

SUMMARY OF THE PRESENT INVENTION

A device for VR, simulations, video gaming, human-computer interface, and the like is disclosed. The invention allows a user to simulate various forms of movement while using a VR system. The invention consists of a pressure-controlled board that can vibrate, which is placed upon a motor controlled rotational swivel that can move 360 degrees or more in either direction. The invention allows the user to control their perceived movement in the virtual reality environment through a natural means of placing pressure on a platform in a certain direction and moving in that direction in the Virtual Environment.

One example of this involves using the invention with a modular attachment, where the attachment would include an interface atop the attachment. This allows the user to imitate motion associated with movement such as the user placing pressure in the direction they would like to move or steer, the VR HMD background environment moves according to that motion. The VR HMD motion is displayed by a computer which would receive input from the user's motion by sensors which can detect the direction and magnitude of pressure being applied.

The invention may be mechanically interchangeable with any of a variety of attachments which may easily be mounted or de-mounted from invention's modular interface. The variety of attachments may include, but are not limited to platforms which have elements thereon resembling a snowboard, a skateboard, a pair of skis, a racing car seat, a cockpit of a flying machine, a bicycle seat or the like.

The invention provides several means of motion feedback that correspond to the user's movement and creates the full sensation of actually moving within the Virtual Environment. One of these forms of motion feedback is a vibration ability which simulates realistic movement such as bumps and jolts on a road that the user is perceiving in the Virtual Environment. Another form of motion feedback is the invention's tilt motion, which allow a user to feel a slight tilt associated with the direction they are moving. Another form of motion feedback is the rotation of the upper platform, which reflects realistic movement of a user turning in either direction. The mixture of rotation, tilting, and vibration causes an overall sensation that the user will associate with real movement, which will reduce motion sickness associated with VR. This will also allow the user to naturally move within the Virtual Environment without limitations on distance.

A primary object of the present invention is to provide a platform that allows the user to control their movement while using a VR system.

Another object of the present invention is to provide a platform that minimizes motion sickness while the user moves within a virtual environment.

Yet another object of the present invention is to provide a platform where the user can receive motion feedback while interacting within their virtual environment.

Still yet another object of the present invention is to provide a platform that can simulate motion associated with the user's movement within a Virtual Environment while using a VR system.

Another object of the present invention is to provide a platform that can be configured to meet multiple use cases for user control and interaction with a VR system.

Another object of the invention is to permit different modular attachments to be affixed to the base of the invention; allowing the user to utilize the invention for multiple simulation purposes.

The present invention overcomes the shortcomings of the prior art by providing a platform that the user can control by using natural locomotion principles such as placing pressure by using their weight in the direction in which they would like to move.

In addition, the present invention overcomes the shortcomings of the prior art by providing a platform that simulates natural movement using physical motion cues; thus, reducing motion sickness associated with traditional VR movement methods.

The aforementioned and other objects and advantages will appear in the following description. In the description reference is made to the accompanying drawings, which forms a part hereof. Various embodiments will be described in sufficient detail to enable those skilled in the art to practice the invention, and it is to be understood that other embodiments may be implied by the description herein.

In order that the invention may be more fully understood, it will now be described with reference to the accompanying drawings in which:

DETAILED DESCRIPTION OF THE PREFERRED EMBODIMENT

The following discussion describes in detail the invention. This discussion should not be taken as limiting the invention to any particular embodiments as practitioners skilled in the art will recognize numerous other embodiments as well.

Figure 1A:
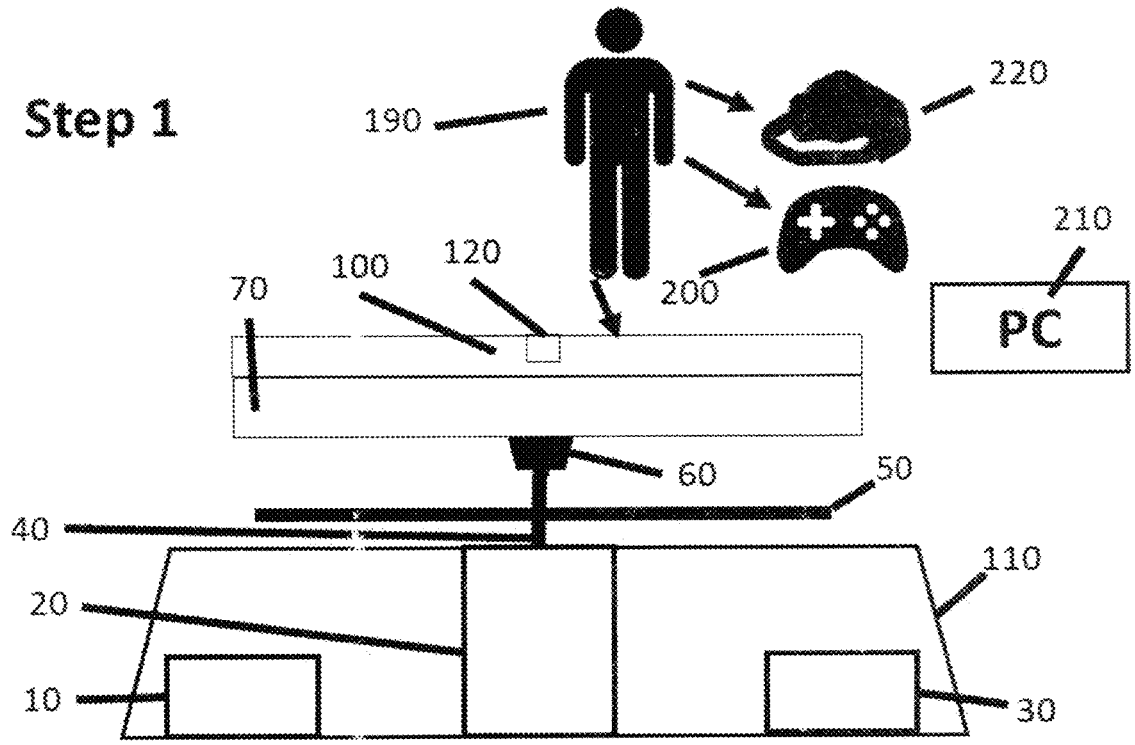
FIG. 1A shows a view of a method of using the invention showing the user sitting or standing on the pressure pad, interfacing with the controller, pressure pad and HMD.

Referring to FIG. 1A, in the first step, the user 190 sits or stands on the pressure pad 100, interfaces with the controller 200, and moves their head while wearing the HMD 220. The PC 210 is an external device which is used to power the VR headset based on all inputs from the user 190; including but not limited to the HMD 220, controller 200, and pressure pad 100. The controller 200 is an external device that inputs the user's 190 actions into the Personal Computer (PC) 210 which are used to control the virtual environment. The HMD 220 is an external device used by VR systems to track the user's 190 head movements and provide visual and audio outputs that simulate the appearance and sounds of a virtual environment around them.

Figure 1B:
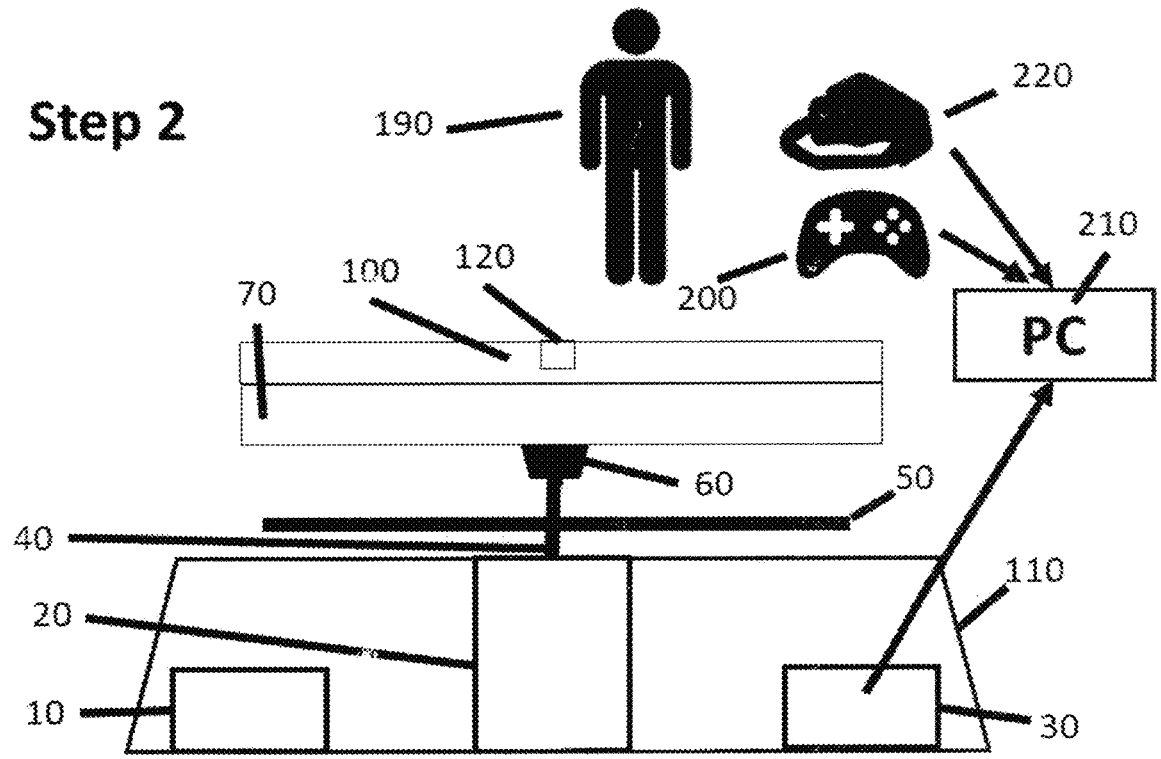
FIG. 1B shows the controller, HMD, and PC Interface providing input to the PC, the PC processing the input and sending the output back through the PC Interface, HMD and controller.

Referring to FIG. 1B, in the second step, the controller 200, HMD 220, and PC interface 30 provides input to the PC 210, at this point, the PC 210 takes the inputs from the controls along with the application-specific algorithms and computes the directional instructions to send back to the PC interface 30.

Figure 1C:
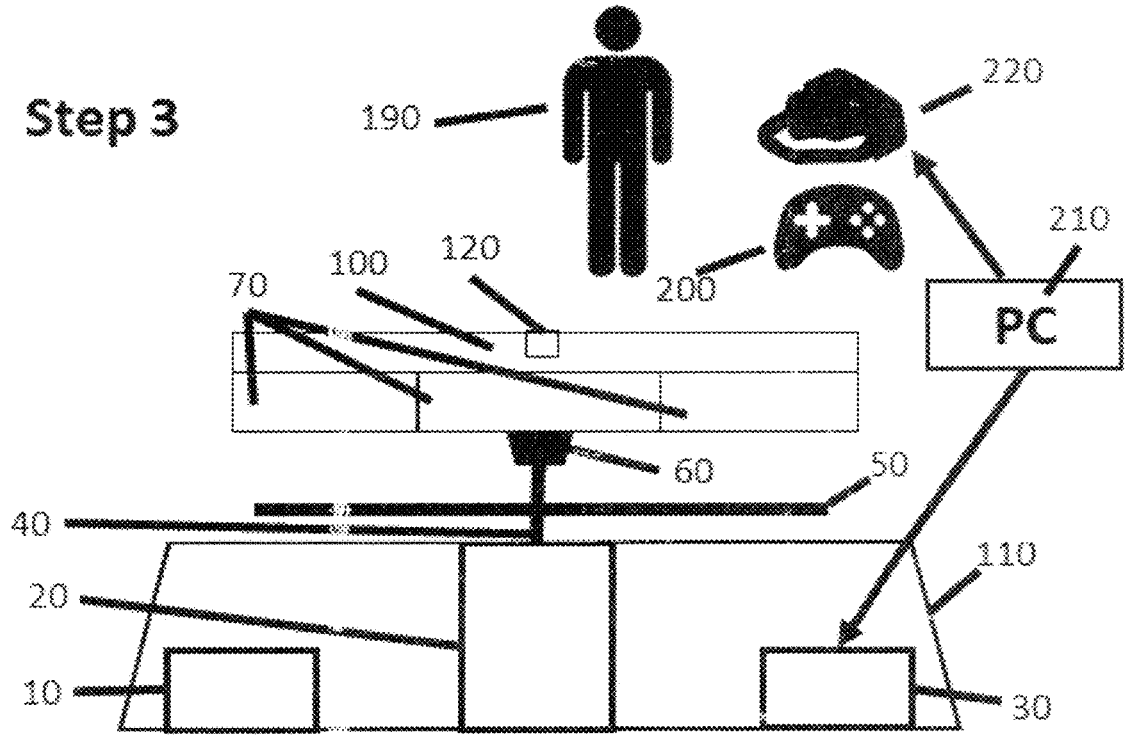
FIG. 1C shows the PC output instructing the upper platform to rotate according to directional instructions, with platform vibration according to vibration motor instructions.

Referring to FIG. 1C, in the third step, the PC 210 sends graphical and auditory outputs to the HMD 220 and platform directional instructions to the PC interface 30. The PC interface 30 sends the signals to the invention's vibration motor system 70 and electric rotation motor 20, which are subsequently are activated in order to provide the user 190 with the appropriate kinetic feedback. This feedback simulates the physical and motion sensations pertaining to the types of movement the user 190 is viewing through the HMD 220 within their Virtual Environment.

Figure 2A:
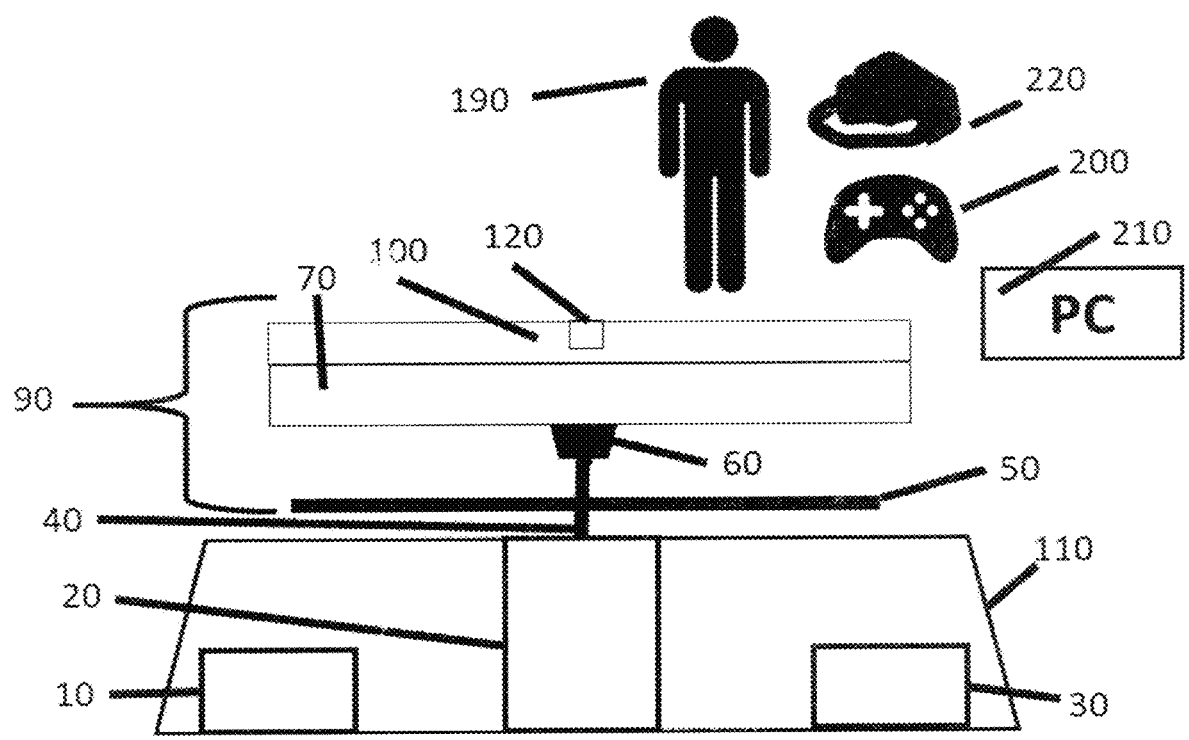
FIG. 2A shows a central cut away view of the invention disclosing the major elements of the invention.

Referring to FIG. 2A, shows the user 190 is standing atop the podium 90 without employing any of the modular attachments in order to interact with a VR or other interactive system. The invention is powered through electricity provided by an external power source 10 that can plug into a wall outlet. The electrical power source will provide power to the electrical rotation motor 20, which will be used to turn the user 190 on the podium 90 0-360 degrees at variable speeds either in the clockwise or counterclockwise direction by a first electrical connection means. The electrical rotation motor 20 may turn the podium 90 indefinitely in either direction beyond 360 degrees as directed. The PC Interface 30 will be either wireless (such as Bluetooth), wired (such as Universal Serial Bus), or other communication means and it will be used to send control signals based on the user's 190 inputs to PC 210 and receive PC 210 control inputs that instruct the invention's rotational motors on the speed and direction to turn, and the vibration motor system 70 on the strength and frequency they should vibrate. The degree of strength and frequency of the vibration of each vibration motor 130 will be based upon input from the PC 210, so it will be consistent with the movement and other environmental factors displayed in the VR HMD 220. The upper platform 50 will be the foundation for all elements of the invention that will be rotated by the electric rotation motor 20. The podium 90 consists of the upper platform 50 and all device components above it, including the tilt shock absorber or elastomeric bushing 60, vibration motor system 70, pressure pad 100, weight sensors 102 and modular attachment interface 120. The invention's primary motor shaft 40 is used to connect the electric rotation motor 20 to the to the bottom of the elastomeric bushing 60; causing the podium 90 and user 190 to rotate according to the direction provided by the electric rotation motor 20. The motor shaft terminal end 44 fits into the aperture 41 located on the bottom of the elastomeric bushing 60. The podium 90 will rotate while the base platform 110 remains stationary. The primary motor shaft 40 will include means such as a rotary electrical contact, otherwise known as a slip ring, to allow for electrical currents to pass from the power supply 10 in the base platform 110 to and through the podium 90 in order to allow the electricity to power to the elements above the upper platform 50 such as the vibration motor system 70 and the pressure pad 100. Additionally, separate electrical currents passing through the primary shaft 40 will also allow for a electrical communication interface between the elements above the upper platform 50 and the base platform 110, such as to receive the pressure pad 100 weight sensor 102 output signals and for the vibration motor system 70 to receive its input control signals. The podium's 90 tilt shock absorber or elastomeric bushing 60 will allow the user 190 to feel a slight tilt in the direction they place their weight, which will provide them with motion/sensory feedback on the direction in which they are moving. The tilt shock absorber or elastomeric bushing can be provided by springs, elastomeric bushings, or other passive dampening measures. The vibration motor system 70 above the upper platform 50 will be triggered based on the VR environment in which the user 190 is interacting. This will enable the user 190 to sense motion feedback and movement associated with real-life movement, such as, but not limited to, riding a skateboard on pavement. The modular attachment interface 120 will be on top of the pressure pad 100 which will allow the user 190 to add different human-system interfaces to the invention, such as, but not limited to, a faux car seat, bicycle, snowboard, skis, surfboard or the like; allowing the user 190 to utilize the invention for multiple VR experiences. The pressure pad 100 will include multiple at least one weight sensors 102 (not shown) sensor 102, mounted on the pressure pad 100, where the weight sensors 102 detect which direction the user 190 is placing the most pressure proportionate to the other weight sensors 102. The weight sensor readings will be sent to the PC interface 30, so it can be received by the PC 210 computer application. The base platform 110 will be used to contain the power source 10, PC interface 30, and electric rotation motor 20. The base platform 110 will also stabilize the podium 90 and the user 190 standing on it by providing weight and width to avoid tipping over. The invention provides the user 190 with several forms of physical feedback that contribute to the user's 190 sensation of real movement while using a VR system: rotational movement, vibration, passive tilt response, and active tilt response. For clarity a first electrical connection means is provided between said external power source and said electrical motor, second electrical connection means is provided between said external power source and said plurality of motor driven vibrating pads, and third electrical connection means is provided between said external power source and said weight sensors in said pressure pad. A fourth electrical communication means is provided between external power source and the centrally disposed modular attachment interface 120 to provide power for any of the modular devices which would be placed therein.

Figure 2B:
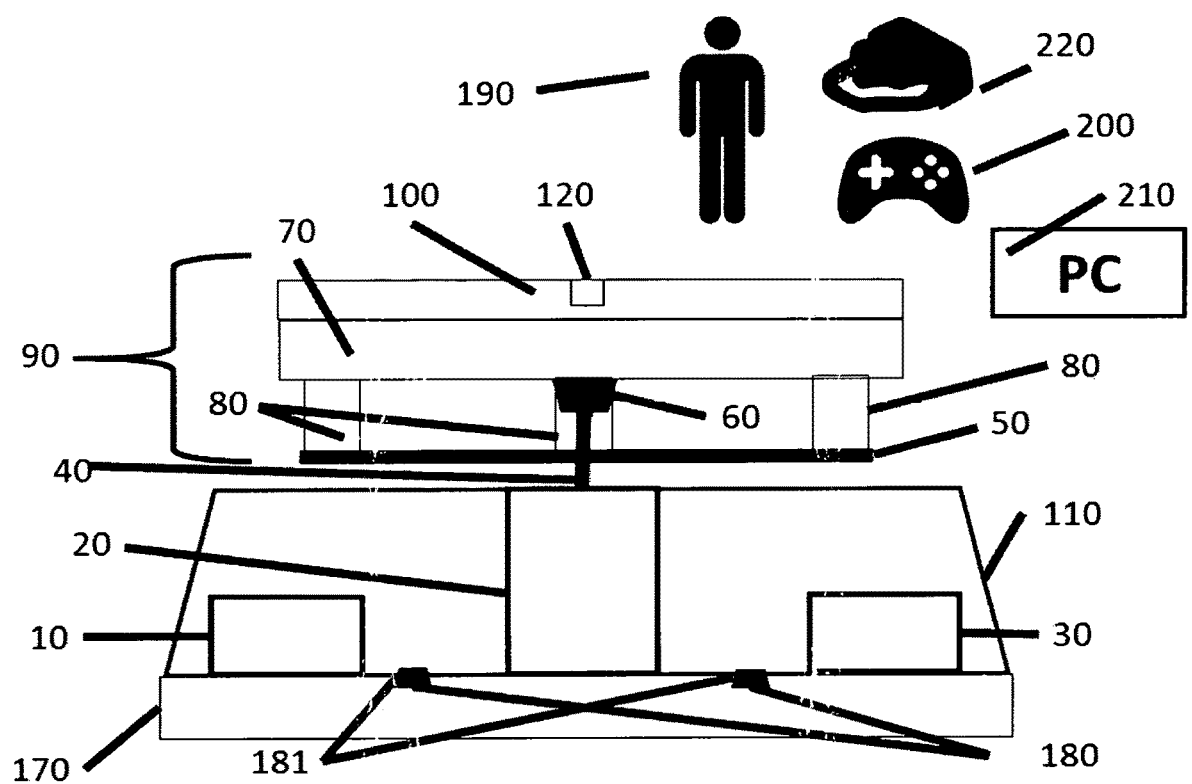
FIG. 2B shows a central cut away view of the invention disclosing the major elements of the invention with modular additions to provide motorized lift and tilt functionality.

FIG. 2B shows additional modular attachments which may be attached to the invention as described in FIG. 2A. One such additional modular mechanically powered attachment would add tilt and lift functions to the podium 90. The base platform 110 includes the ability to add a modularly attached lift 170 which will attach to the bottom of the base platform using rubberized connectors 180 being inserted into apertures 181. The rubberized connectors may be any appropriate type of connector and may be refereed to as a plurality of attachment tabs 180. The platform lift 170 will allow for the invention to be mechanically raised and lowered to correspond to the motion occurring within the VR environment. This can be accomplished using hydraulic lifts, actuators, or a motorized jack. The invention also features the ability to add the modularly attached mechanical directional tilt system 80 between the upper platform 50 and vibration motor system 70 that will cause the user 190 to tilt in a certain direction based upon inputs from the PC 210 controlling the VR environment. The directional tilt system 80 will allow the user 190 to experience an additional form of movement that corresponds to the movement the user 190 encounters in the virtual environment viewed through the VR HMD. This includes, but is not limited to, the experience of going up a hill and having the pressure pad 100 platform on which the user 190 is standing tilt upwards to simulate the angle at which the user 190 is going up. The PC 210 controlled directional tilt system 80 will be powered by hydraulic lifts, actuators, or other mechanical mechanisms.

Figure 6A:
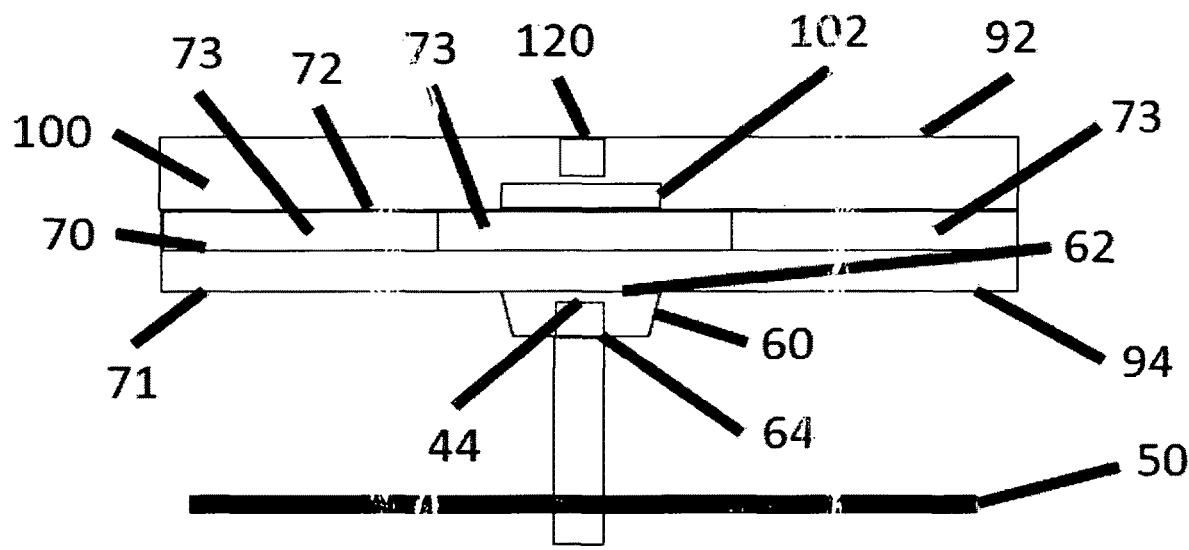
FIG. 6A is a partial view of FIG. 1 showing the weight sensors and detail of the elastomeric bushing.
Figure 7:
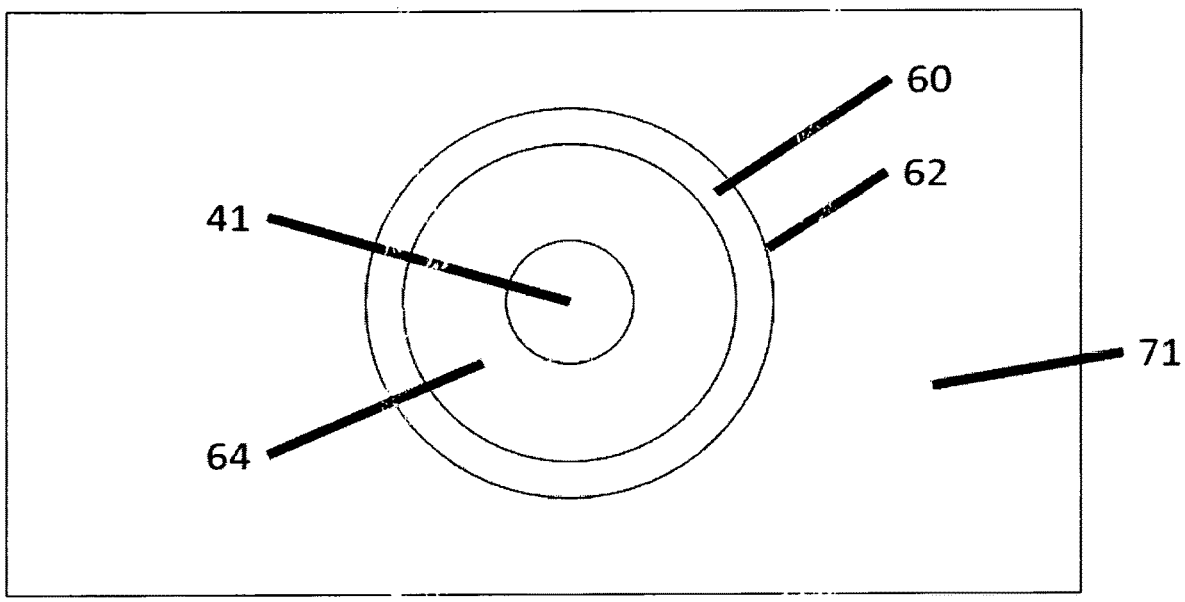
FIG. 7 is a bottom view of the elastomeric bushing showing the bottom structure.

Referring now to FIG. 6A, a partial view of FIG. 2A including the podium 90 is shown. Podium 90 has a podium upper side 92 and a podium middle side 94. The vibration motor system 70 has a plurality of vibrating pads 73. The vibrating pads 73 are between the bottom of the vibration motor system 71 and the top of the vibration motor system 72. Below the modular attachment interface 120 is weight sensor 102. The tilt shock absorber or elastomeric bushing 60 includes the top of the elastomeric bushing 62 and the bottom of the elastomeric bushing 64. Referring to FIG. 7 a bottom view of the tilt shock absorber or elastomeric bushing 60 is shown as if looking upward from the center of the upper platform 50. The aperture to receive primary motor shaft 41 is cylindrical and sized to tightly receive motor shaft terminal end 44 within. FIG. 7 shows the mounting of the tilt shock absorber or elastomeric bushing 60 top side 62 to the bottom 71 of the vibration motor system 70. The tilt shock absorber or elastomeric bushing 60 top side 62 is centrally mounted to the bottom 71 of the vibration motor system 70.

Figure 6B:
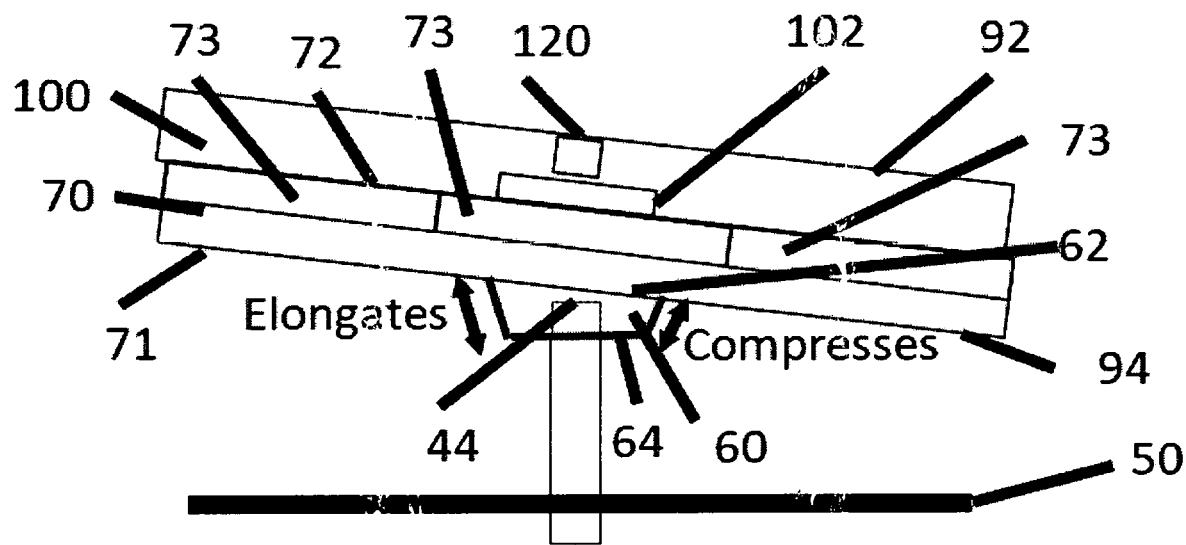
FIG. 6B is a partial view of FIG. 1 showing the elastomeric bushing in the lean position.

Referring now to FIG. 6B a partial view of the podium 90 is shown. FIG. 6B illustrates what happens when the user 190 would move their weight forward while using any of the attachments, such as the seat attachment 150 or the bike attachment when placed in the modular attachment interface 120. It is readily seen that tilt shock absorber or elastomeric bushing 60 compresses in the direction which the user 190 moves their weight in and elongates 180 degrees (or the antipode) or in the opposite side to which the user moves their weight in. This causes the pressure pad 100, the vibration motor system 70, the modular attachment interface 120 and any attachment connected to the modular attachment interface 120 to be angularly displaced from the horizontal plane shown generally about the center of the pressure pad 100. The annular displacement or tilt can easily be seen by the change of the position of the pressure pad between FIG. 6A and FIG. 6B.

Figure 3:
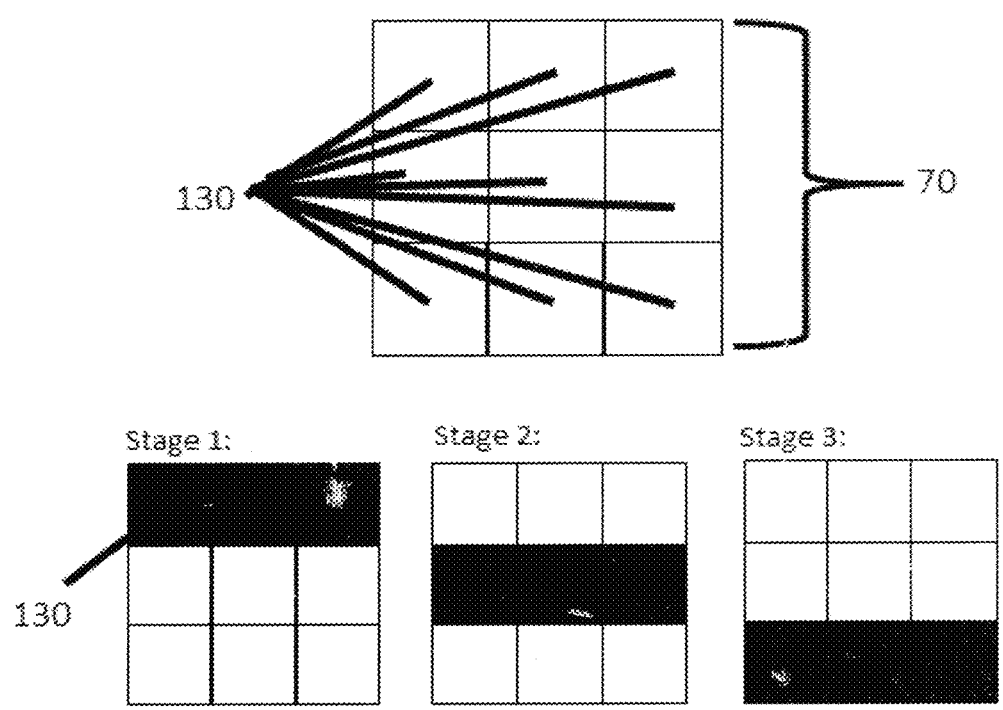
FIG. 3 describes a top view of the vibration pad showing a plurality of regions in a lattice, each of which are individually connected to a vibration motor, where a vibration motor may singly vibrate a pad or a plurality of motors may vibrate a plurality of pads in unison with one another creating effects that can be felt by the user.

Referring to FIG. 3, the vibration motor system 70 is a plurality of regions in a lattice each of which are individually connected to a vibration motor 130, where a vibration motor 130 may singly vibrate a pad or a plurality of vibration motors 130 may vibrate either singly or in unison with one another simulating terrain and other effects that can be felt by the user 190. The vibration motor system 70 will cause the user 190 to sense motion feedback and movement associated with real-life movement, such as, but not limited to, riding a skateboard on pavement. The vibration motors system 70 will be arranged in a 2×2 grid (or larger as denoted in FIG. 3) of vibration motors 130. Each of the vibration motors 70 have a pad 73 which will vibrate due to the action of the vibration moors 70. The pads 73 (best seen in FIG. 6A) may be termed vibration pads 73. The individual vibration motors 130 within the vibration motor system 70 will be activated to correspond with the direction of movement and location of bumps and other terrain in the virtual environment. This will cause the user 190 to sense the directionality and movement of the vibration.

Figure 4A:
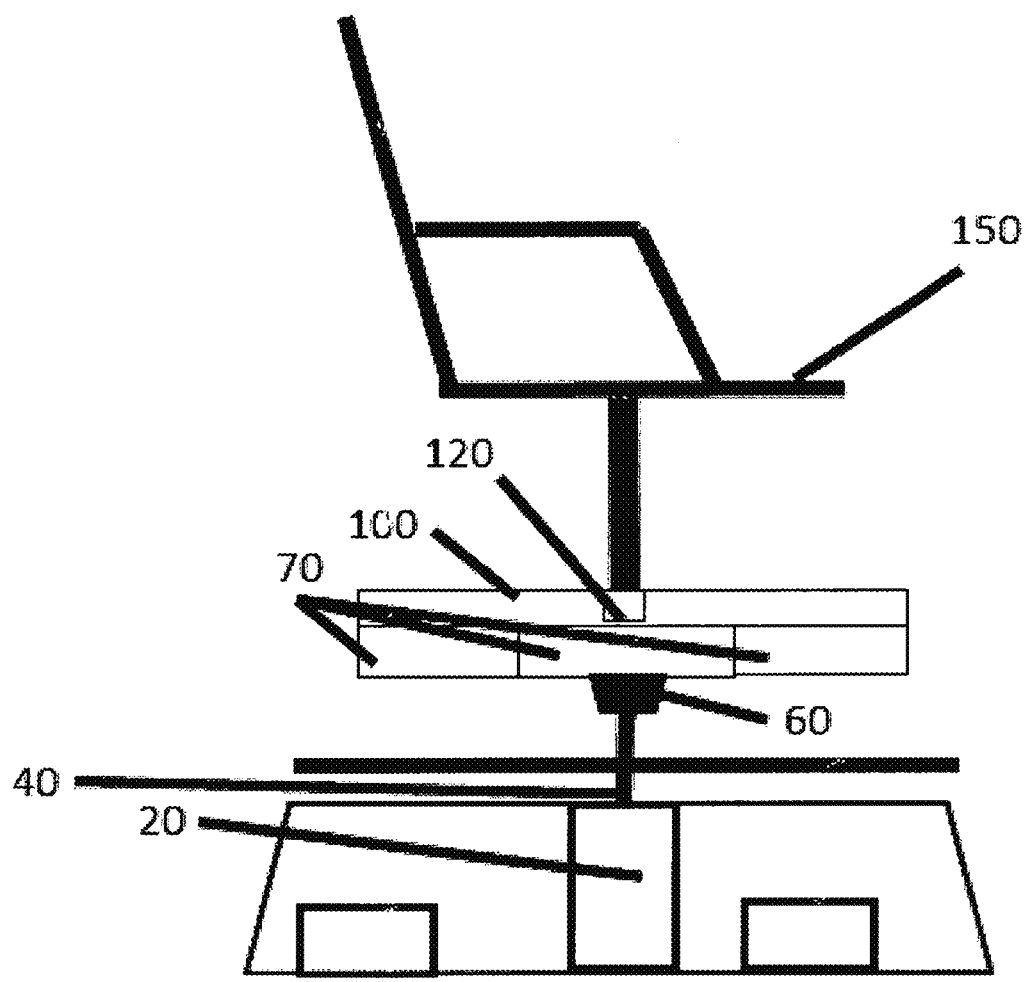
FIG. 4A is a cutaway view of an embodiment of the invention where a modular seat is placed on top of the stand and the user sits atop the seat.
Figure 4B:
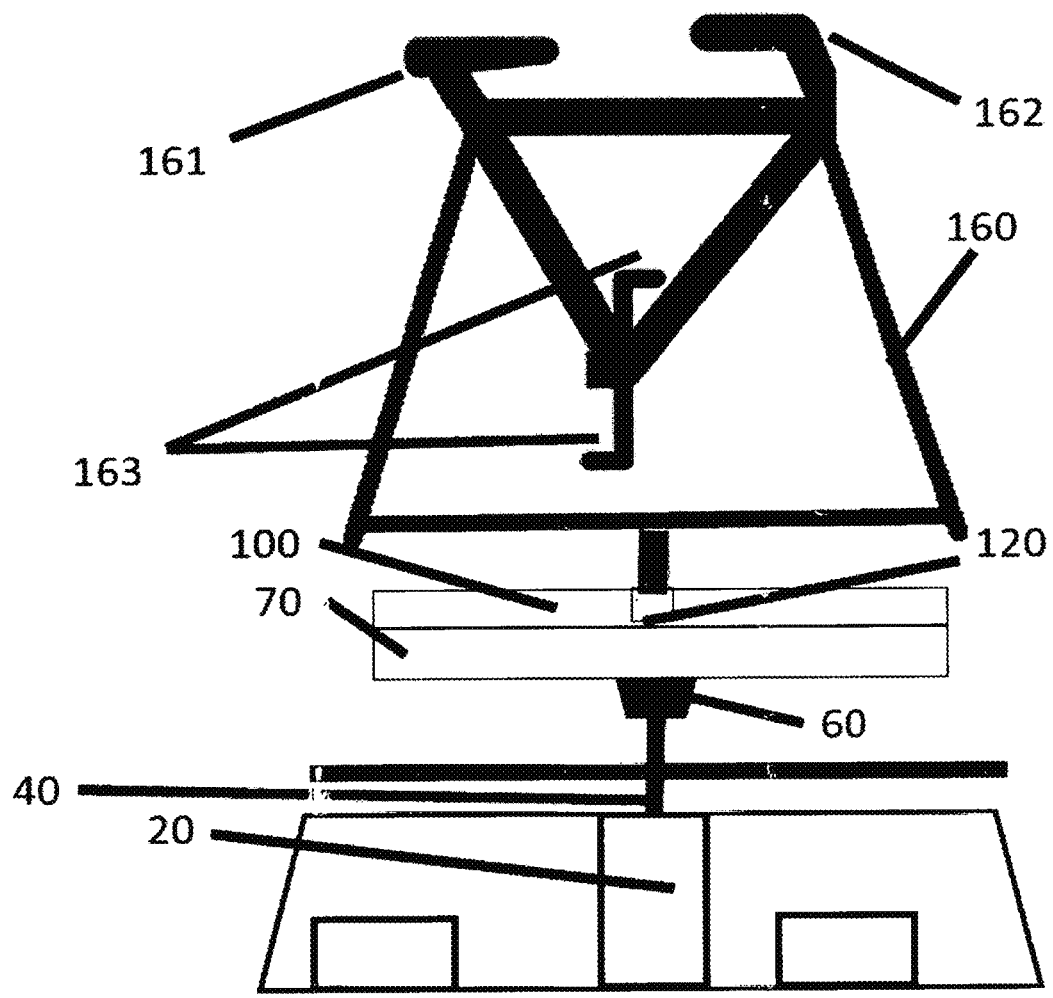
FIG. 4B is a cutaway view of an embodiment of the invention where a modular bicycle seat is placed on top of the stand and the user sits atop the bicycle seat and engages the pedals and handlebars.

Referring to FIGS. 4A and 4B, modular attachments can be attached to the invention using the modular attachment interface 120. There are many known ways to attach a pole-style element into an aperture, including, but not limited to, a ball and detent, a quick release mechanism, a conventional mechanical fastener, or other attachment means.

Referring to FIG. 4A, the modular attachments include, but are not limited to the seat attachment 150, which can be used to simulate racing, flying, and other seated applications. The seat attachment 150 can be connected to the invention through the modular attachment interface 120. The seat attachment 150 will provide a human-computer interface that is similar to seated applications, allowing the user 190 to experience physical feedback similar to what is viewed when simulating seated VR experiences.

Referring to FIG. 4B, the bike attachment 160 can be attached to the invention in order to simulate motorcycle, bicycle, or other applications that would utilize an interface similar to a bike. The bike attachment 160 can be connected to the invention through the modular attachment interface 120. The bike attachment 160 would consist of a minimal frame for structural purposes with the 3 primary human interface points: the bike seat 161 for the user 190 to sit on, the bike handlebars 162 for the user 190 to hold on to and control the bike, and the bike pedals 163 for the user 190 to use to simulate pedaling a real bike. The bike seat 161 can be similar to a traditional bicycle seat, motorcycle seat, although it can take on additional forms, such as a horse saddle in order to simulate horse riding. The bike handlebars 162 can be crafted to have similar brakes to a bicycle or turned to accelerate the engine like a motorcycle. When simulating a motorcycle application, the bike pedals 163 can be adjusted to fixed position to simulate foot pegs. For example, the bike attachment 160 could be used to simulate riding a horse, based upon the similar configuration of handlebars 162 being close to reins, and bike pedals 163 being physically similar to stirrups. The bike attachment 160 will provide a human-computer interface that is similar to applications involving a physical configuration similar to a bike, allowing the user 190 to experience physical feedback similar to what is viewed when simulating bike-related VR experiences.

Figure 5A:
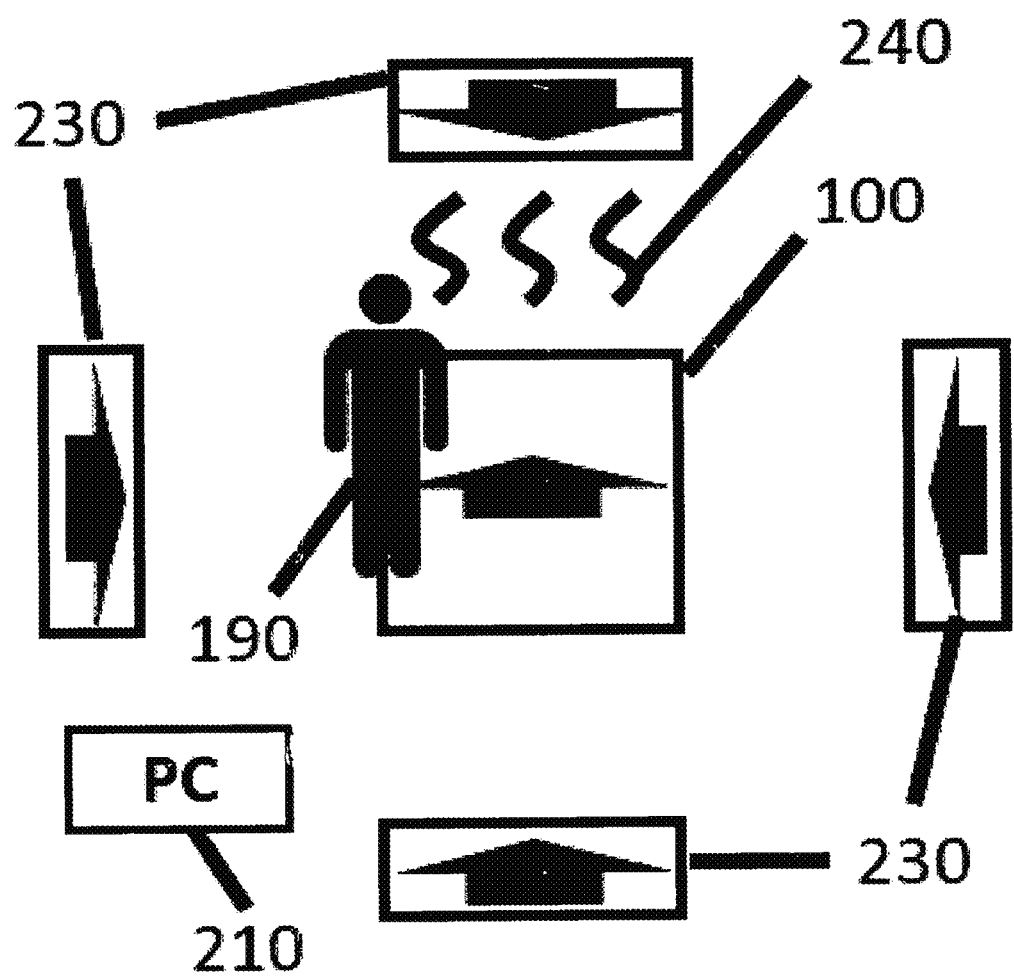
FIG. 5A is a top-level view of the invention where it is surrounded by fans that are active to simulate wind in the direction in which the user is moving forward at zero degrees.
Figure 5B:
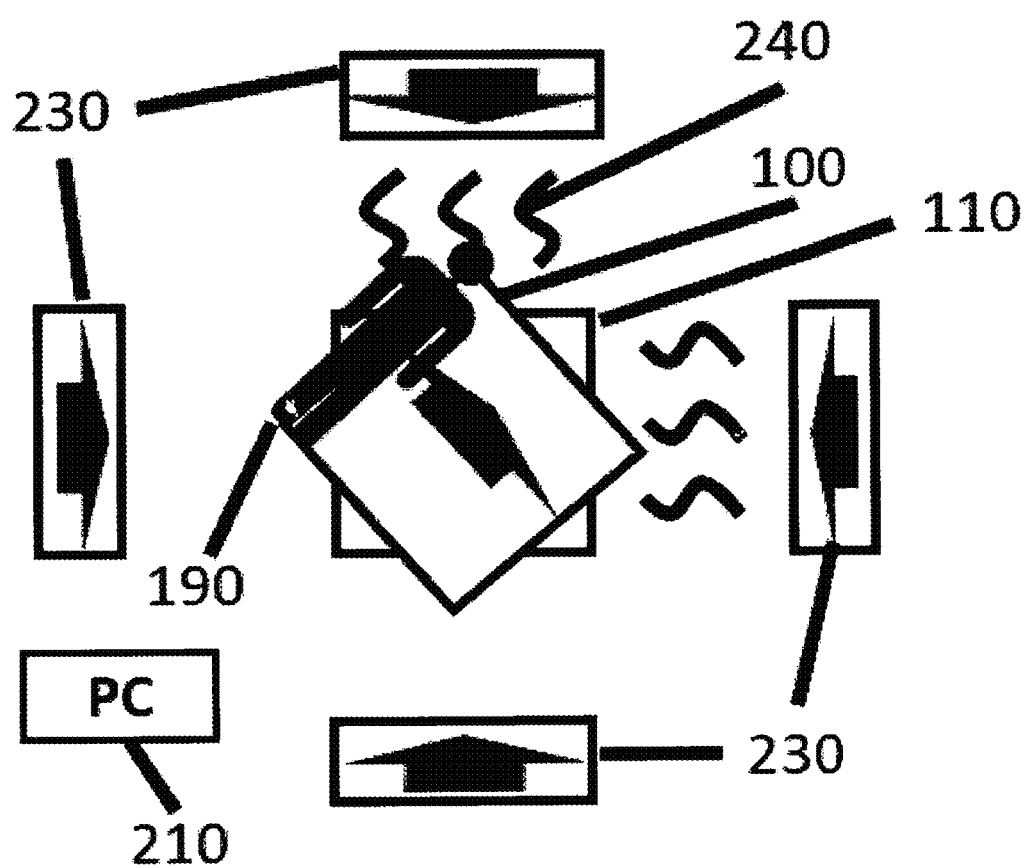
FIG. 5B is a top-level view of the invention where it is surrounded by fans that are active to simulate wind in the direction in which the user is moving, here shown at 45 degrees.

Referring to FIG. 5A, modular fans 230 are placed in each direction to the front, back, left, and right of the pressure pad 100; although configurations consisting of 1 or more fans (not pictured) may be utilized as well depending on the level of realism desired by the user 190. The fans will connect to the PC 210, which will provide instructions to active and set the speed of the modular fans 230 based upon the virtual environment. When the user 190 is standing upon the pressure pad 100 and they are both facing forward in the 12:00 position or zero degrees direction and the user is moving forward in the virtual environment, the modular far 230 in the zero degrees direction will activate, which will cause air 240 to blow in the direction of the user 190; causing the sensation of movement in that direction. This will simulate the natural event of a person feeling wind from the direction in which they are moving towards, in this case towards the 12:00 position or zero degrees. The nodular fans 230 may be used for additional applications aside from movement, such as to simulate movement of other objects or external forces Referring to FIG. 5B, when the user 190 is standing upon the pressure pad 100 and they are both are facing in the 1:30 position or 45 degrees direction and the user is moving forward to the virtual environment, the modular fans 230 in the 0 degrees and 90 degrees directions will activate, which will cause air 240 to blow from both directions in the direction of the user 190; causing the sensation of movement in the median of both directions that the air 240 is blowing from, in this case the 1:30 position or 45 degrees direction.

Figure 5C:
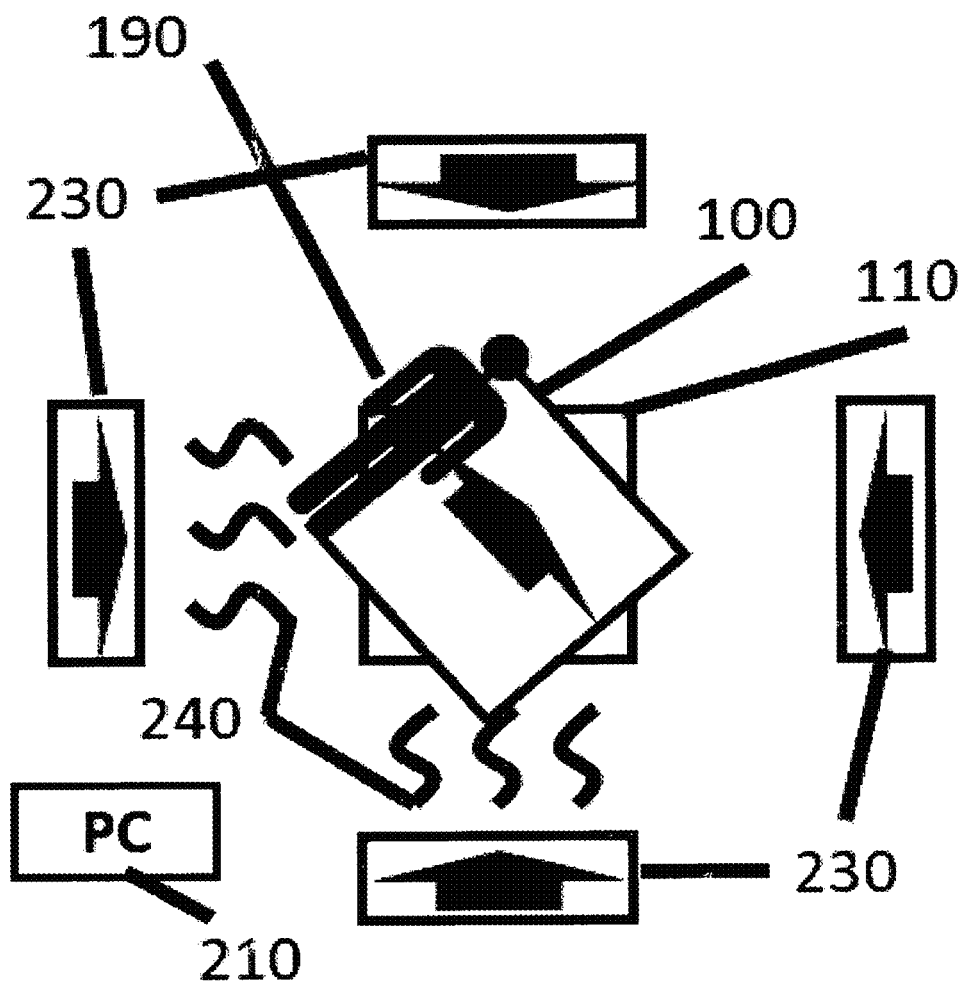
FIG. 5C is a top-level view of the invention where it is surrounded by fans that are active to simulate wind in the direction in which the uses is moving backward, here shown at 225 degrees; while the user is facing at 45 degrees.

Referring to FIG. 5C, when user 190 is standing upon pressure pad 100 and they are both facing the 1:30 position or 45 degrees direction and the user is moving backwards in the opposite direction from where they are facing within the virtual environment, the modular fans 230 to the 180 degrees and 270 degrees directions will activate, which will cause air 240 to blow in the direction in which the user 190 is moving in the virtual environment; causing the sensation of movement in the median of both directions that the air 240 is blowing from, in this case the 7:30 position or 225 degrees direction.

Although the invention can be used for VR, it is not limited solely to such an application. Other entertainment and simulation applications could use the invention such as training simulations for skateboarding, snowboarding, and surfing.

The invention is also not limited to use of VR involving an HMD. The invention could be used with any type of VR or other interactive system such as a user standing on a platform, surrounded by screens.

Without further analysis, the foregoing will so fully reveal the gist of the present invention that others can, by applying current knowledge, readily adapt it for various other uses without omitting features that, from the standpoint of prior art, fairly constitute essential characteristics of the generic or specific aspects of this invention.

In summary, in the embodiment of FIG. 2, the invention is a human-computer interface device which permits the user 190 to control their movement within a Virtual Reality simulation and receive mechanically powered feedback that simulates real-life movement. The invention will allow the user 190 to stand on top of it and control their movement within a Virtual Reality Environment by leaning in a direction. The invention's pressure pad 100 will detect which direction the user is 8u+ing in, and output that information to the PC 210. The PC 210 will calculate the appropriate feedback response based upon the user's 190 inputs (such as the direction the user leans in the attachment which is mounted in the modular attachment interface 120) and the Virtual Environment in which the user 190 is interacting, and the PC 210 will send the controls to the invention, causing it to rotate, tilt and vibrate as applicable. The motion and other physical feedback that are provided to the user 190 in response to their actions while interacting with the Virtual Environment will give the user 190 the sensation of real motion. This will result in a more realistic experience while reducing the motion sickness associated with existing location options within Virtual Reality systems. The invention will be modular, such as to allow for the user 190 to mount a seat attachment 150 (such as for a car) on top of the invention and sit atop it in order to simulate the experience of driving. An alternative seated application is to mount a modular bike attachment 160, including bike seat 161, handlebars 162, and bike pedals 163 atop the invention. Both applications would be able to be utilized on the standard platform, but they will be further enhanced by a version of the invention that utilizes motor-controlled directional tilt system 80. This motor-controlled directional tilt system 80 will allow the invention to tilt the user 190 in the direction of their movement, rather than the standard platform which relies upon the user's 190 movement of their weight in order to tilt the pressure pad 100 in any direction. The active tilt version of the invention will provide greater accuracy of the physical feedback corresponding to the motion in the virtual environment, which will provide the user 190 with a more realistic experience and further reduce motion sickness while using VR systems. The directional tilt system 80 can also be used for other applications, including the standard pressure pad 100, by providing tilt movement to correspond to when the user 190 hits a bump or hill in the VR environment. Although the invention was initially designed for Virtual Reality, any interactive computer entertainment system could benefit.

The invention permits a user 190 to use a single base platform 110 either singly, or with the addition of any of the plurality of attachable modular devices. Depending on the modular attachment chosen, one may expand their VR experience by any one of, or combination of, real rotation, real tilt, real vibration or fan driven air.

To prevent accidental injury from the user 190 falling off the podium, the placement of pads surrounding the invention would be advisable. The pads can either be placed on the ground surrounding the invention or propped up through a series of stands surrounding the invention.

It is not intended that the present invention be limited in its application beyond the claims made below.

PARTS LIST

| Part # | Part Name |
|---|---|
| 10 | Power Supply |
| 20 | Electric Rotation Motor |
| 30 | Personal Computer (PC) Interface |
| 40 | Primary Motor Shaft |
| 41 | Aperture to Receive Primary Motor Shaft |
| 44 | Motor shaft terminal end |
| 50 | Upper Platform |
| 60 | Tilt Shock Absorbers or Elastomeric Bushing |
| 62 | Top of Elastomeric Bushing |
| 64 | Bottom of Elastomeric Bushing |
| 70 | Vibration Motor System |
| 71 | Bottom of Vibration Motor System |
| 72 | Top of Vibrating Motor System |
| 73 | Vibrating Pads |
| 80 | Directional tilt System |
| 90 | Podium |
| 92 | Podium, Upper side |
| 94 | Podium, Middle side |
| 100 | Pressure Pad |
| 102 | Weight Sensor(s) |
| 110 | Base Platform |
| 120 | Modular Attachment Interface |
| 130 | Vibration Motor |
| 150 | Seat Attachment |
| 160 | Bike Attachment |
| 161 | Bike Seat |
| 162 | Bike Handlebars |
| 163 | Bike Pedals |
| 170 | Platform Lift |
| 180 | Rubberized Connectors or attachment tabs |
| 181 | Attachment aperatures |
| 190 | User (Human) - External |
| 200 | Controller - External |
| 210 | PC - External |
| 220 | Head Mounted Display (HMD) - External |
| 230 | Modular Fans |
| 240 | Fan Blown Air |

I claim:

1. An apparatus to be utilized by a user wearing a head mounted virtual reality device, the head mounted virtual reality device displaying a virtual environment to the user's eyes, said apparatus providing a plurality of physical motions in a concurrent fashion to the virtual environment being projected by the head mounted virtual reality device, said apparatus comprising:

a base forming an enclosure, said enclosure including an interior, an electrical cord which passes through said enclosure to connect to an external power source, said enclosure further including a centrally disposed electric motor having a shaft which passes through said enclosure, said electric motor drawing power from the external power source, said base further including a Peripheral Computer (PC) interface, said base including a top side with a first central aperture through which said motor shaft passes through;

a first platform having a second central aperture which said motor shaft passes through, said motor shaft is secured to said first platform at said second central aperture, said motor shaft having a terminal end;

an elastomeric bushing having a top side and a bottom side, said elastomeric bushing bottom side having a cylindrical aperture centrally located thereon, said cylindrical aperture sized to allow said motor shaft terminal end to be secured tightly therein, coupling said motor shaft terminal end to said elastomeric bushing;

a podium (90) having an upper side (92) and a lower side (94), said top side attached centrally to a bottom (71) of a vibration motor system (70), said podium upper side (92) includes a centrally disposed modular attachment interface thereon;

a pressure pad having weight sensors (102) located under said podium upper side (92);

a plurality of motor driven vibrating pads (73) located underneath said pressure pad;

said top side of said elastomeric bushing centrally attached to an underside of said plurality of said motor driven vibrating pads;

whereby the user stands on said upper side of said podium, and the user leans in any direction and said podium tilts in that direction, and said podium is rotated in a clockwise or counterclockwise direction through action of said centrally disposed electric motor rotating said podium, and where said plurality of motor driven vibrating pads generates vibrations.

2. The apparatus according to claim 1 wherein the user moves the user's weight in a first direction, causing said pressure pad and said vibration motor system to put pressure on said elastomeric bushing, where the movement of the user's weight in said first direction on said pressure pad and said vibration motor system causes said elastomeric bushing to compress in said first direction causing said pressure pad and said vibration motor system to tilt in said first direction.

3. The apparatus according to claim 2 wherein said plurality of motor driven vibrating pads located underneath said pressure pad generates vibrations.

4. The apparatus of claim 3 wherein said centrally disposed modular attachment interface is adapted to receive any of modular devices, having an attachment element which is received in said centrally disposed modular interface and selected from the group of modular devices consisting of a driving car seat, a snowboard, a skateboard, a pair of skis, a cockpit of an aircraft and a bicycle whereby the user can select any one of the modular devices in said group and secure it in said centrally disposed modular attachment interface.

5. The apparatus according to claim 4 wherein first electrical connection means is provided between said external power source and said electrical motor, second electrical connection means is provided between said external power source and said plurality of motor driven vibrating pads, and third electrical connection means is provided between said external power source and said weight sensors in said pressure pad.

6. The apparatus according to claim 5 wherein said fourth electrical communication means is provided between said external power source and said centrally disposed modular attachment interface, permitting electrical energy to be provided to any of said modular devices affixed to said centrally disposed modular attachment interface.

7. The apparatus according to claim 6 wherein the peripheral computer interface (30) sends control signals to rotate said electrical motor shaft (40) and to cause said vibrating pads (73) to vibrate, said control signals to be sent wirelessly.

8. The apparatus according to claim 7 further comprising a mechanically controlled tilt system (80) located between said first platform and said underside of said plurality of said motor driven vibrating pads, whereby said mechanically controlled tilt system (80) tilts said podium to allow the user to feel what is displayed in said virtual environment.

9. The apparatus according to claim 8 wherein said base enclosure includes an underside with a plurality of attachment apertures (181), a base enclosure lift (170), said base enclosure lift including a top with a plurality of attachment tabs, said attachment tabs modularly affix to said plurality of attachment apertures, whereby said base enclosure lift lifts or lowers said base enclosure lift.

10. The apparatus as claimed in claim 9 including 4 fans offset 90 degrees from each other, surrounding said base.

11. The apparatus as claimed in claim 6 wherein the peripheral computer interface (30) sends control signals to rotate said electrical motor shaft (40) and to cause said vibration motor system (70) to vibrate, said control signals to be sent through wires.

* * * * *